(12) United States Patent
Cao et al.

(10) Patent No.: US 7,461,056 B2
(45) Date of Patent: Dec. 2, 2008

(54) TEXT MINING APPARATUS AND ASSOCIATED METHODS

(75) Inventors: Yunbo Cao, Beijing (CN); Hang Li, Beijing (CN); Olivier Ribet, Bellevue, WA (US); Benjamin Martin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/054,113

(22) Filed: Feb. 9, 2005

(65) Prior Publication Data

US 2006/0206306 A1 Sep. 14, 2006

(51) Int. Cl.
G06F 7/00 (2006.01)
G06F 17/30 (2006.01)
(52) U.S. Cl. .......................................................... 707/4
(58) Field of Classification Search ................. 707/3–5, 707/103 R; 715/500; 704/4, 3
See application file for complete search history.

(56) References Cited

U.S. PATENT DOCUMENTS

| | | | | |
|---|---|---|---|---|
| 5,953,718 | A * | 9/1999 | Wical | 707/5 |
| 6,460,034 | B1 * | 10/2002 | Wical | 707/5 |
| 6,718,325 | B1 * | 4/2004 | Chandra | 707/6 |
| 7,043,476 | B2 * | 5/2006 | Robson | 707/7 |
| 7,240,062 | B2 * | 7/2007 | Andersen et al. | 707/100 |
| 2003/0066025 | A1 * | 4/2003 | Garner et al. | 715/500 |
| 2003/0074368 | A1 * | 4/2003 | Schuetze et al. | 707/103 R |
| 2003/0110181 | A1 * | 6/2003 | Schuetze et al. | 707/103 R |
| 2003/0233224 | A1 * | 12/2003 | Marchisio et al. | 704/4 |
| 2004/0167888 | A1 * | 8/2004 | Kayahara et al. | 707/3 |
| 2007/0174041 | A1 * | 7/2007 | Yeske | 704/3 |

OTHER PUBLICATIONS

Martin, Rajman et al. , Text Mining-knowledge extraction from unstructured textual data , Mar. 31, 2004, Laboratory Computer Science Dpt Swiss Federal Institute of Technology (http://liawww.epfl.ch/Publications/Archive/RajmanBesancon98a.pdf).*
Mikio Yamamoto et al., Using Suffix Arrays to compute Term frequency and Document Frequency for All substrings in a Corpus , Apr. 28, 2000 (http://research.microsoft.com/users/church/wwwfiles/CL_suffix_array.pdf).*
In-Ho Kang, Query Type Classification for Web Document Retrieval, Jul. 28-Aug. 1, 2003, ACM.*
"Text Data Minining With Optimized Pattern Discovery" Hiroki Arimura, Jul. 16, 2000.*
"Hierarchy-Conscisous Data Structures for String Analysis" Carlo Fantozzi, Jun. 6, 2002.*

(Continued)

*Primary Examiner*—Hung T Vy
(74) *Attorney, Agent, or Firm*—Steven M. Koehler; Westman, Champlin & Kelly, P.A.

(57) ABSTRACT

A method for extracting key terms and associated key terms for use in text mining is provided. The method includes receiving unstructured text documents, such as emails over a customer service system. Term candidates are extracted based on identifying consecutive word strings satisfying a context independency threshold. Term candidates are weighted using mutual information to generate a list of weighted terms. The weighted terms are then recounted. Terms are associated based on Chi-square values. Associated terms can then be used for information retrieval. A user interface can be personalized with individual user profiles.

17 Claims, 8 Drawing Sheets

OTHER PUBLICATIONS

"On Classification and Regression", S. Morishita, Proc. DS'98, LNAI 1532, 1998.*

L. F. Chien 1999. PAT-Tree-Based Adaptive Keyphrase Extraction for Intelligent Chinese Information Retrieval. Information Processing and Management, vol. 35, No. 4, pp. 501-521, no months, year.

M. Yamamoto and K. Church, 2001. Using Suffix Arrays to Compute Term Frequency and Document Frequency for All Substrings in a Corpus. Computational Linguistics, vol. 27:1, pp. 1-30, MIT Press, no month.

* cited by examiner

TEXT MINING APPARATUS AND ASSOCIATED METHODS

BACKGROUND OF THE INVENTION

The present invention relates to text mining. In particular, the present invention relates to extracting key terms and associated key terms for data mining purposes.

Customers often send companies emails that ask questions, suggest new features or improvements, explain how a product is being used, report problems, praise or criticize customer service, and the like. Similarly, Internet message boards, webblogs, focus groups, newsgroups, and the like also generate text, which discuss similar product and customer service subjects.

The information contained in these emails and other text sources can be very useful. The information, for example, can permit companies to measure consumer satisfaction, predict market trends, detect problems with products, classify documents for research, and the like.

However, some large companies may receive thousands of emails per day on many subjects. The volume of information available from Internet and other sources is also very large. Therefore, it can be difficult to retrieve useful information from the voluminous amount of data received.

Text mining is a variation of a field called "data mining," which tries to find interesting patterns from large databases. A typical example in data mining is using consumer purchasing patterns to predict which products to place close together on shelves, or to offer coupons for, and so on. For example, a customer buying a flashlight is likely to also buy batteries.

Text mining is an extension of data mining. The difference between regular data mining and text mining is that, in data mining, patterns are analyzed from structured databases of facts; in text mining, patterns and/or associations in unstructured text are analyzed to extract useful information. Also, databases are designed for programs to process automatically; text is written for people to read. Presently, there are limitations in how well computer programs can be designed to "read" and understand text as people do. There are also limitations and costs associated with people reading large volumes of text in order to extract useful information.

Different forms of text mining utilizing a computer can include keyword searches and various relevance ranking algorithms. While these methods can be effective, a user must usually spend significant amounts of time to effectively identify and sort relevant documents. Thus, text mining can be time-consuming, tedious, and expensive.

As a result, an improved system and method that addresses one, some, or all of the issues associated with present text mining would have significant utility.

SUMMARY OF THE INVENTION

A method for extracting associated key phrases or terms for use in text mining is provided. The method includes generating term candidates using a suffix array and values for evaluating context independence of the term candidates. Term candidates are weighted to generate a key term list based on weighted mutual information. The terms are then recounted to generate terms with weighting and more accurate count values. The method can further include automatic synonym detection. During text mining, information associated with terms is extracted from text documents via a user interface that can be personalized.

DETAILED DESCRIPTION OF ILLUSTRATIVE EMBODIMENTS

The present invention relates to extracting key terms to provide an efficient and accurate tool for text mining. In one aspect, key terms are extracted with weighting and frequency (i.e. count) values. In another aspect, the key terms can then be used for performing text mining to extract useful information from text documents. In still another aspect, synonymous terms can be automatically generated for each extracted key term. In another aspect, the present inventions include a user interface that can be personalized with individualized profiles. Before addressing the present invention in further detail, a suitable environment for use with the present invention will be described.

Figure 1:
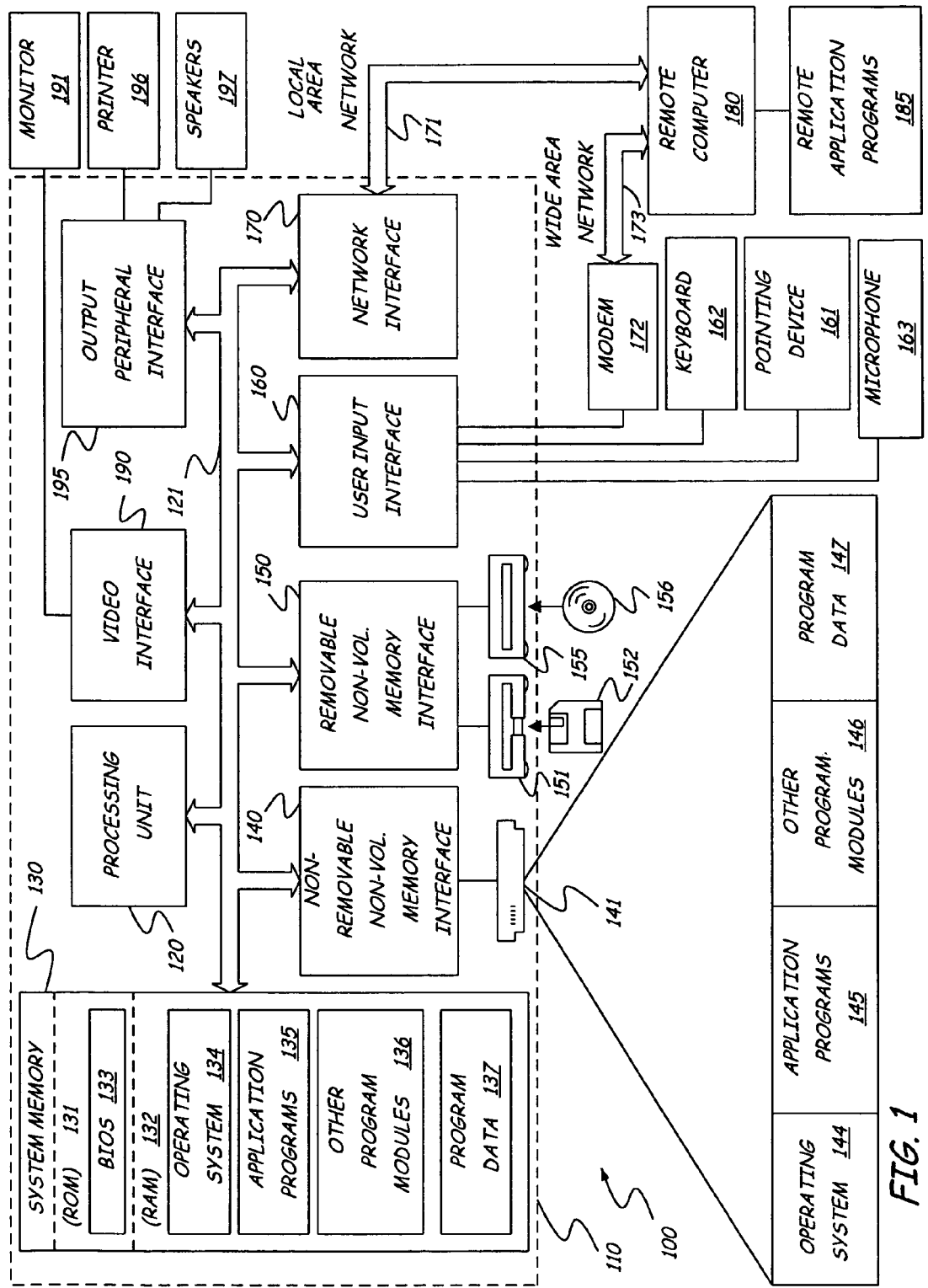
FIG. 1 illustrates a general computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. For natural user interface applications, a user may further communicate with the computer using speech, handwriting, gaze (eye movement), and other gestures. To facilitate a natural user interface, a computer may include microphones, writing pads, cameras, motion sensors, and other devices for capturing user gestures. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
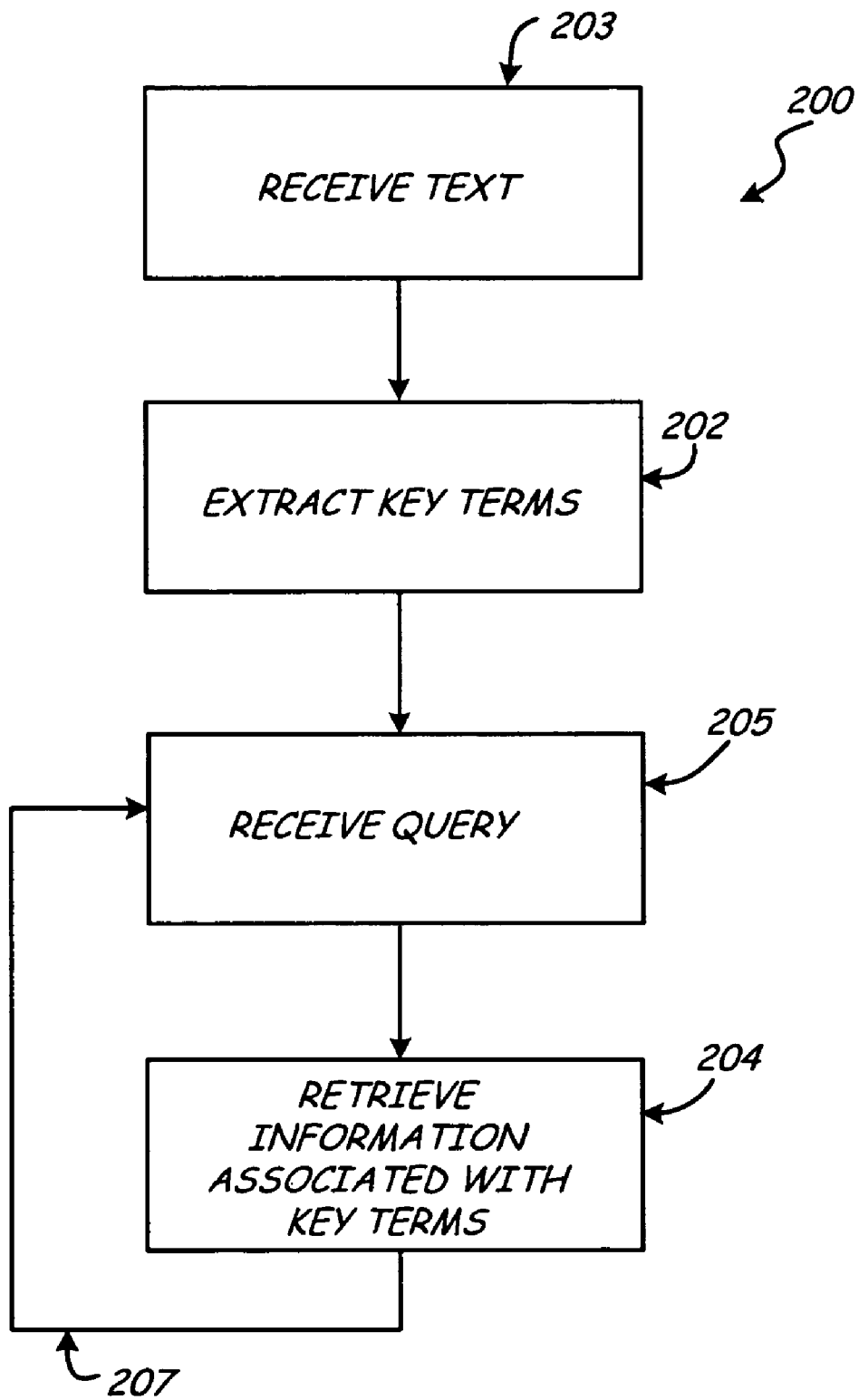
FIG. 2 illustrates broad aspects of the present inventions.
Figure 3:
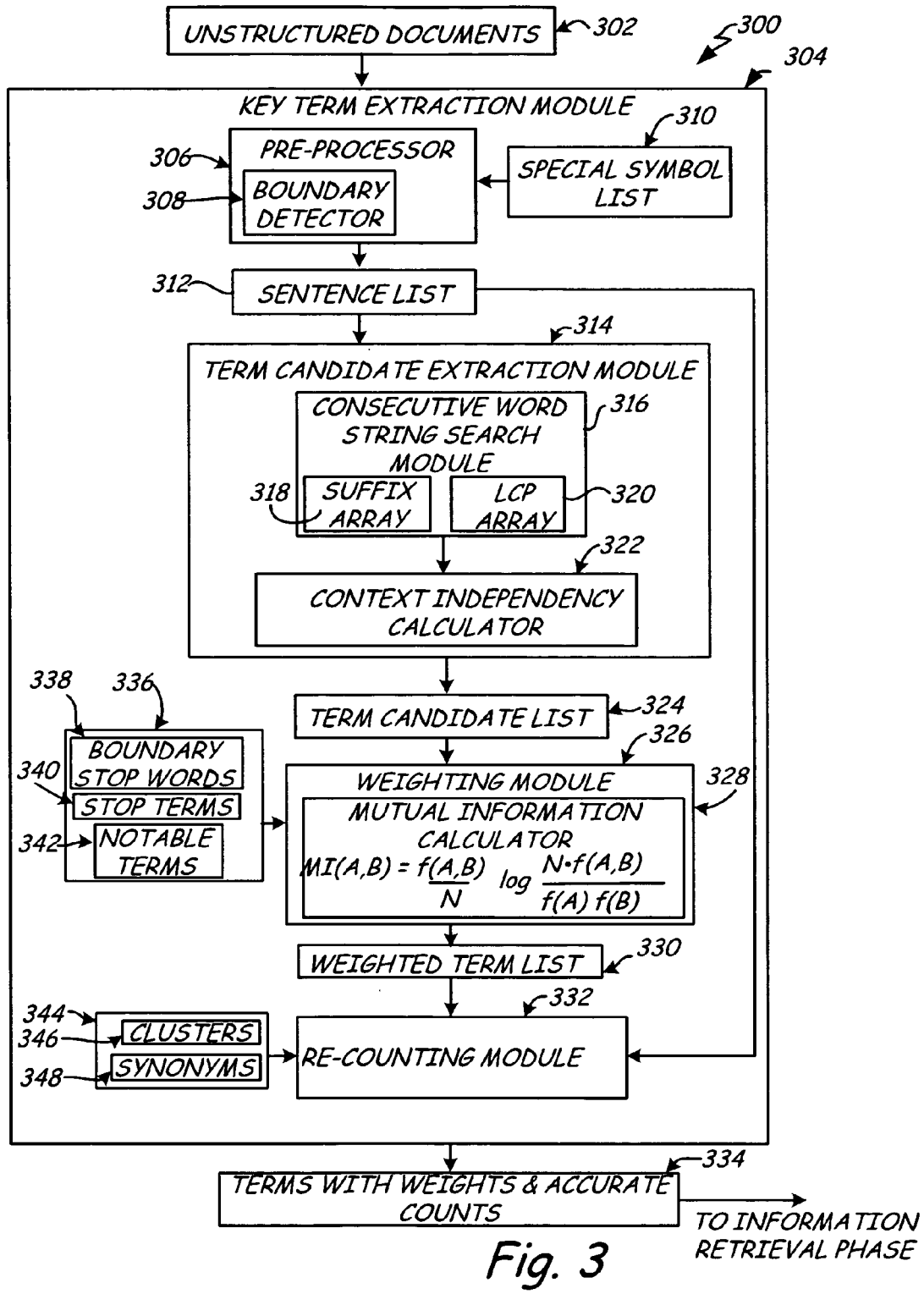
FIG. 3 is block diagram illustrating a system that extracts key terms in accordance with the present inventions.
Figure 5:
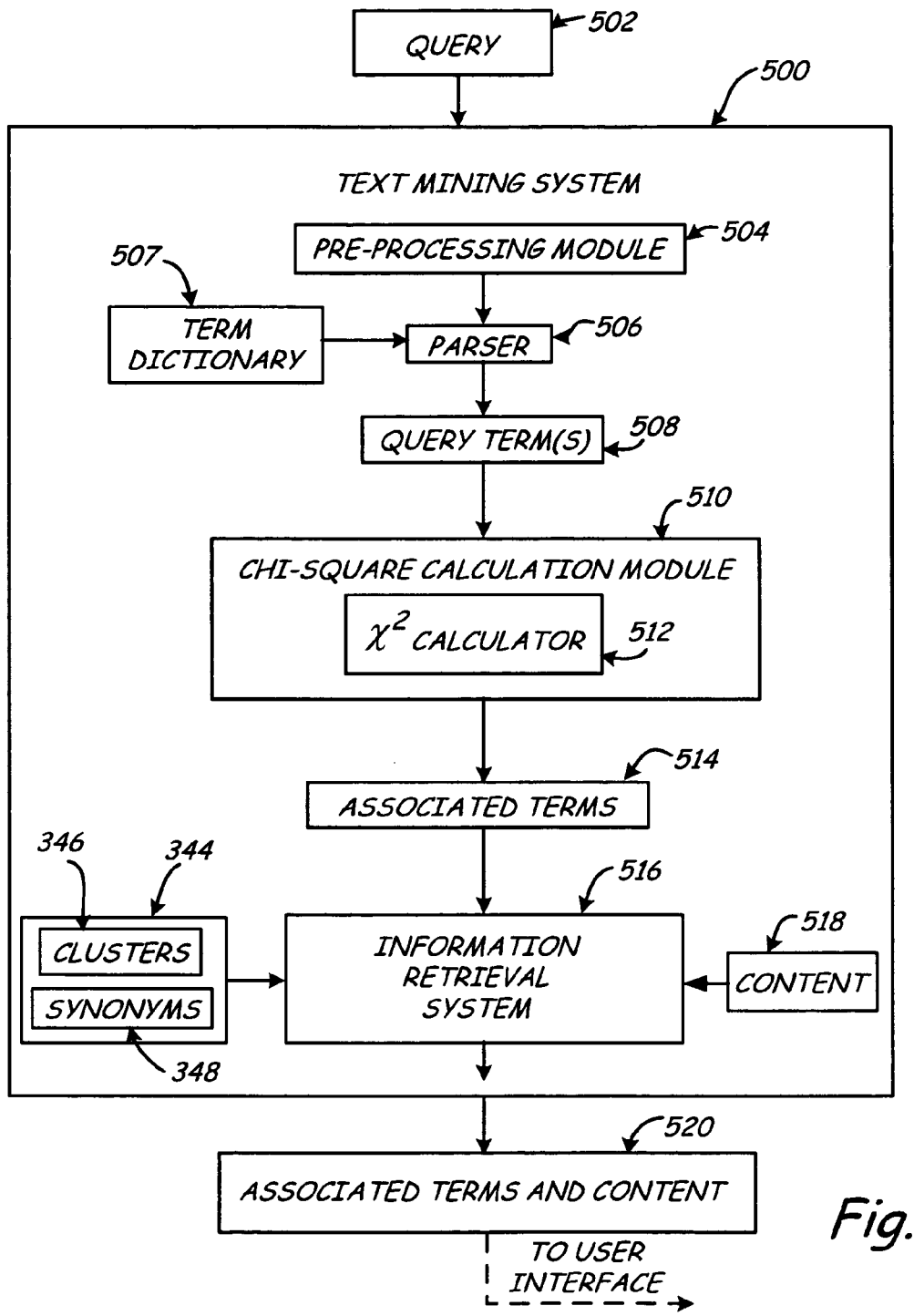
FIG. 5 is a block diagram illustrating a system for mining text.

FIG. 2 is flow diagram showing two broad aspects or steps of the present invention embodied as text mining method 200. FIGS. 3 and 5 are block diagrams illustrating modules for performing each of these text mining aspects. Step 202 includes extracting key terms from received text as indicated at 203. The extracted key terms are used later in an information retrieval phase. The information retrieval phase includes receiving a query such as from a user over a user interface. Step 204 includes retrieving information or content associated with the key terms. Text mining method 200 is recursive in that any number of queries can be received as indicated at 207.

Figure 4:
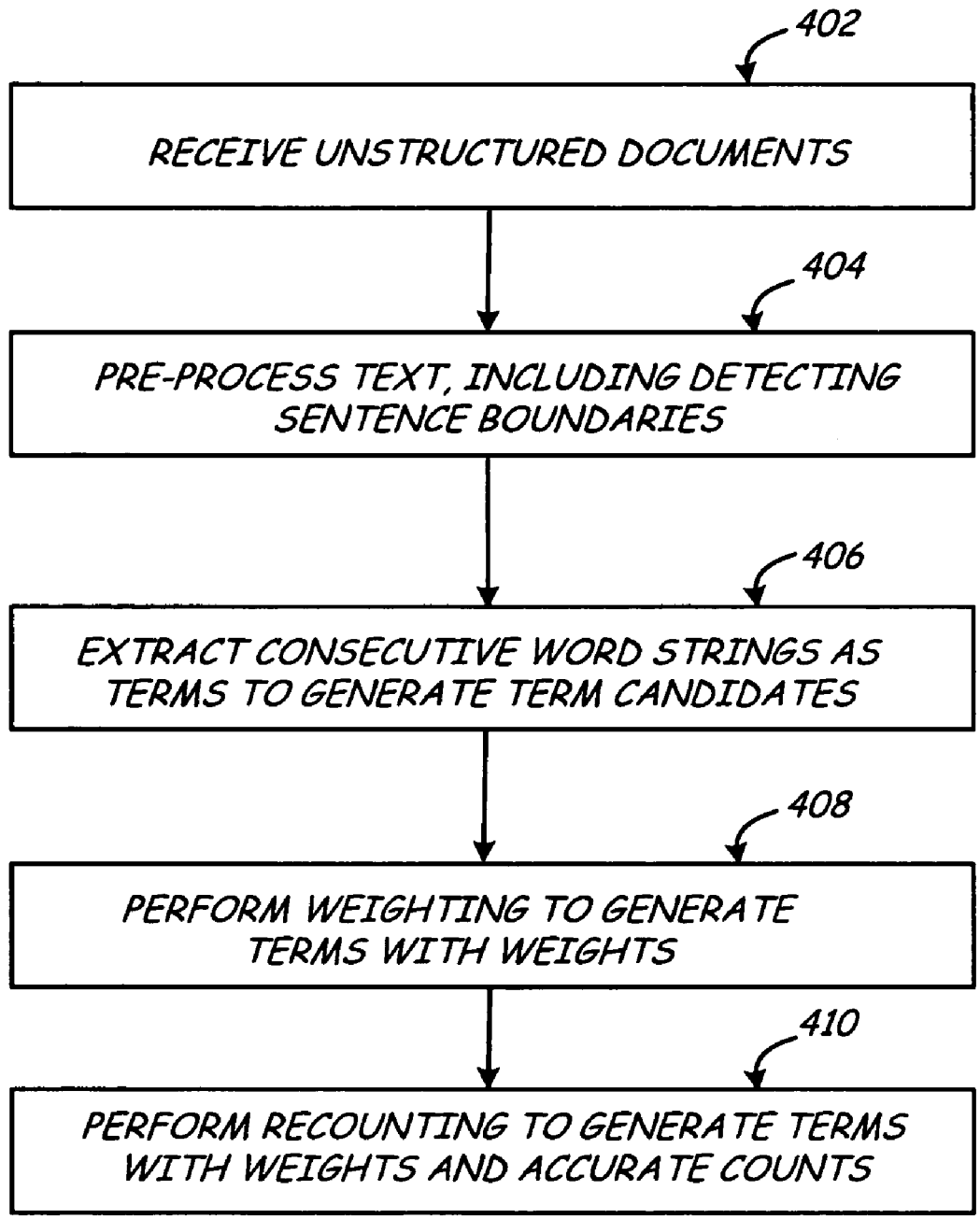
FIG. 4 illustrates steps of a method corresponding to FIG. 3.

FIG. 3 is a block diagram illustrating system 300 for performing key term extraction in accordance with the present inventions. FIG. 4 illustrates a method corresponding to FIG. 3, and is discussed concurrently. At step 402, unstructured text or documents 302 are received by key term extraction module 304. Unstructured documents 302 can include emails, text from Internet newsgroups, message boards, and chatsrooms, webblogs, transcripts of focus group, customer surveys, and the like. Unstructured documents 302 can be selectively obtained and can include information that a company considers useful, for example, to improve customer satisfaction as discussed above.

At step 404, pre-processor 306 performs pre-processing or "data cleaning" on text of unstructured documents 302. For example, pre-processor 306 can remove email headers, and other symbols or words that are considered meaningless. In some embodiments, pre-processor 306 comprises boundary detection module 308, which accesses special symbol list or table 310 including, for example, symbols such as ".", ",", "&", "#", "!", "?" that are used to detect boundaries between sentences and other phrases, such as phrases separated by commas. Boundary detection module 308 detects sentence boundaries and replaces them with a symbol or token recognized as a sentence boundary. Sentence boundaries are useful because it can be assumed that terms do not cross sentence boundaries. Pre-processor 306 generates sentence list 312 that can be stored in a temporary file for further processing.

At step 406, term candidate extraction module 314 receives sentence list 312. It is noted that a "term" includes at least two consecutive word strings. Term candidate extraction module 314 comprises consecutive word string search module 316. Using suffix array 318, consecutive word string search module 316 performs indexing of consecutive word strings or N-gram sequences using indexing methods, such as suffix array indexing. In some embodiments, other means of extracting consecutive word strings can be used, such as a "suffix tree" method. Generally, only N-gram sequences having a frequency, count, or co-occurrence of at least 2 are extracted. Also, it can be advantageous to use LCP array 320 in conjunction with suffix array 318 to identify and extract consecutive word strings having the desired frequency or count.

A suffix array is a simple data structure that enables lookup of any substring of a string and identification of repeated substrings. It is more compact than a suffix tree and is amenable to storage in secondary memory. A suffix array can be thought of as a sorted list of the suffixes of a given string. It is noted that a suffix is a substring that extends to the end of the given string. The sorted list is presented as an array of integers that identify the suffixes in order. The suffix array for the 11-letter string "ABRACADABRA", with an endmark # that collates low, is given below, together with the corresponding suffixes. Together, the suffix array and string enable binary search for any substring, e.g. "CAD". A useful auxiliary data structure is an LCP array, an array of lengths of the longest common prefix between each substring and its predecessor in the suffix array. The second column below gives the LCP array for the corresponding example.

EXAMPLE

Suffix Array

| 11 | # |
| 10 | A# |
| 7 | ABRA# |
| 0 | ABRACADABRA# |
| 3 | ACADABRA# |
| 5 | ADABRA# |
| 8 | BRA# |
| 1 | BRACADABRA# |
| 4 | CADABRA# |
| 6 | DABRA# |
| 9 | RA# |
| 2 | RACADABRA# |

EXAMPLE

Corresponding LCP Array

| 11 | 0 | #ABRACADABRA |
| 10 | 0 | A#ABRACADABR |
| 7 | 1 | ABRA#ABRACAD |
| 0 | 4 | ABRACADABRA# |
| 3 | 1 | ACADABRA#ABR |
| 5 | 1 | ADABRA#ABRAC |
| 8 | 0 | BRA#ABRACADA |
| 1 | 3 | BRACADABRA#A |
| 4 | 0 | CADABRA#ABRA |
| 6 | 0 | DABRA#ABRACA |
| 9 | 0 | RA#ABRACADAB |
| 2 | 2 | RACADABRA#AB |

Term candidate extraction module 314 further comprises context independency calculator 322 that calculates entropy values of context words surrounding terms. Typically, context independency calculator 322 performs stop word removal by removing words such as "of", "the", "and", "have", "not", "etc.", "are" and the like. Generally, stop words cannot be at the beginning or end of a term. The left context of a term T (and right context) is defined as the entropy of surrounding words immediately left (or right) of the consecutive word string. The larger the entropy for a consecutive word string, the more context-independent it is, and hence, the greater likelihood that it is a term. Context independency calculator 322 can rank consecutive word strings based on context independency values. In some embodiments, term candidates are selected based on a selected context independency threshold. In other embodiments, the top ranking k consecutive word strings (i.e. those having the highest context independency values) are generated by term candidate extraction module 314 as term candidate list 324.

At step 408, weighting module 326 receives term candidate list 324 and calculates a weighting value for each term candidate. In most embodiments, weighting module 326 accesses or receives resources 336, which comprise boundary stop words 338, stop terms 340, and notable terms 342, to perform weighting or to eliminate some term candidates from term candidate list 324. For example, some term candidates can be filtered out using boundary stop words 338 and/or stop terms 340 so that the number of term candidates to be weighted is reduced. As noted above, consecutive word strings occurring only once are filtered, and thus, are not considered term candidates 324. However, notable terms 342 are terms that may occur only once but can still be extracted as key terms.

In most embodiments, weighting module 326 comprises mutual information calculator 328, which calculates the mutual information of patterns A and B. The mutual information of patterns A and B, or MI(A,B) is defined as the log-likelihood ratio of the joint probability of patterns A and B over the probability of A and B, which can be expressed as follows:

$$MI(A, B) = \log\left(\frac{P(A, B)}{P(A)P(B)}\right).$$

Assuming that a consecutive word string of any length can be expressed as "AB" where "A" and "B" are each a pattern of one or more word strings making up consecutive word string "AB". Pattern "A" can also be viewed as the left portion of consecutive word string "AB" while pattern "B" can be viewed as the right portion or side of "AB".

Therefore, the weighted mutual information WMI or "weighting" of A and B is given by the following:

$$WMI(A, B) = \frac{f(A, B)}{N} \log \frac{N \cdot f(A, B)}{f(A)f(B)}$$

where f(A,B) is the number of documents sentences (i.e. content) where both A and B occur, f(A) is the number of documents where A occurs, f(B) is the number of documents where B occurs, and N is the number of documents such as unstructured documents 302 received at input. However, in other embodiments, content can comprise individual sentences such as from sentence list 312 rather than documents 302.

Weighting module 326 uses mutual information values generated by mutual information calculator 328 to identify terms meeting a selected WMI threshold. It is noted, however, that other measures of mutual information can be used such as the "significance estimation function". Weighting module 326 generates weighted term list 330, which comprises key terms and their respective weights.

At step 410, recounting module 332 generates a list of terms with weights and accurate counts 334 by segmenting the corpus using weighted terms from list 330 as a dictionary or lexicon. In most embodiments, recounting module 332 accesses or receives resources 344 comprising clusters 346 and synonyms 348. Construction of synonyms 348 and/or clusters 346 are generally separate procedures, which output synonyms and/or clusters to be used in recounting (as well as mining associated terms described in greater detail below). Synonyms 348 can be constructed manually or partially automatic. For example, a separate synonym construction module can generate all morphological forms of terms and/or their constituent word strings. The word "book" can be expanded to all its morphological forms: "books", "booked", "booking", etc. to assist in generating synonyms 348.

For illustration, a synonym called "Windows Family" can be constructed and include synonymous terms such as "Windows XP" and "Windows NT". During processing of actual documents, if "Windows XP" and "Windows NT" occur 2 and 3 times, respectively, the synonym "Windows Family" occurs 5 times because it can be viewed as a single term. Clusters like synonyms (such as "Windows Family") can also be considered single terms during recounting.

It is noted that term recounting generally results in more accurate frequency counts as described in the example below.

EXAMPLE

Assume the following input:

Terms: Windows and Windows XP
Text: "Windows XP is the latest version of the Windows desktop."
Term count at output:

Before re-count: Windows XP(1), Windows (2)
After recounting: Windows XP(1), Windows (1)

Thus, before re-counting, the count for "Windows" is incorrectly identified at 2. After recount, the count is correctly identified at 1. It is noted that accurate key term counts are important for accurate information retrieval.

Figure 6:
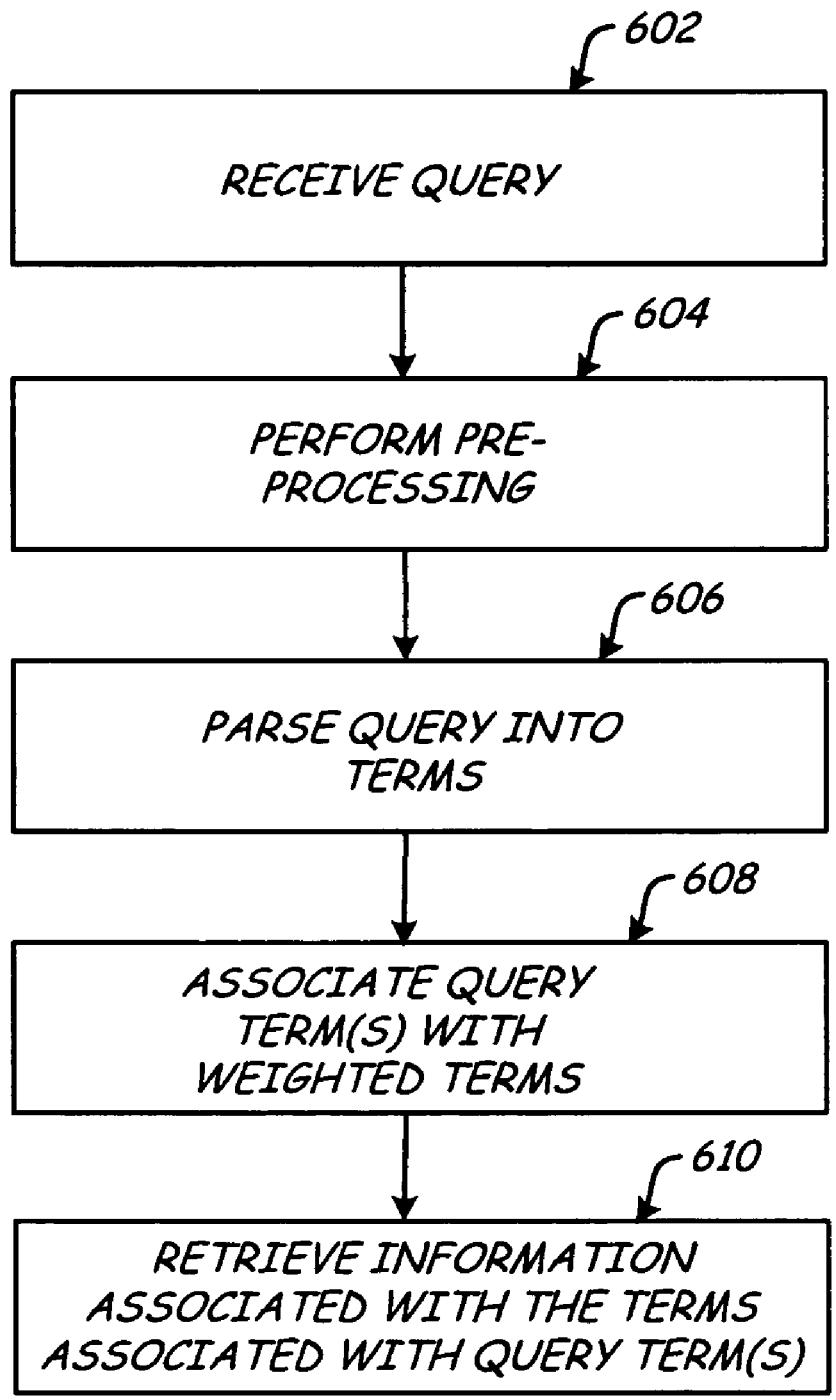
FIG. 6 illustrates steps of a method corresponding with FIG. 5.

FIGS. 5 and 6 are illustrative of a system and method for performing information retrieval in accordance with the present inventions. At step 602, query 502 is received by text mining system 500. Query 502 can be in the form of a phrase of one or more word strings, a sentence, a question, etc. that is received over a user interface. In many embodiments, text mining system 500 comprises pre-processing module 504, which can be similar in function to pre-processor 306 illustrated in FIG. 3. For example, pre-processing module 504 can segment query 502 into individual words, and/or remove grammatical features such as commas and/or stop words such as "of" and "and".

At step 606, parser 506 parse query 502 into terms. In some embodiments, parser 506 accesses or receives term dictionary 507 comprising terms such as weighted terms 334 described with respect to FIG. 3 in order to parse query 502 into query terms 508. Text mining can then be performed for query terms 508 to retrieve relevant content from text documents 302 illustrated in FIG. 3.

At step 608, Chi-square calculation module 510 receives query term(s) 508. Chi-square calculation module 510 comprises $\chi^2$ calculator 512, which calculates $\chi^2$ values between the query term(s) 508 and the weighted terms 334 extracted from the text documents 302. Chi-square calculation module 510 first obtains or receives term count information 334 from the text documents (see table below) in order to calculate $\chi^2$ values

TABLE

|  | y | $\bar{y}$ | Total |
|---|---|---|---|
| x | f(x, y) | f(x, $\bar{y}$) | f(x) |
| $\bar{x}$ | f($\bar{x}$, y) | f(x, y) | f($\bar{x}$) |
| total | f(y) | f($\bar{y}$) | N | where f(x,y) is the number of documents where both terms x and y appear; f(x,$\bar{y}$) is the number of documents where x appears but y does not appear; f(x) is the number of documents where x appears; f($\bar{x}$,y) is the number of documents where x does not appear and y appears; f($\bar{x}$,$\bar{y}$) is the number of documents where neither x nor y appears; f($\bar{x}$) is the number where x does not appear; f(y) is the number where y appears; f($\bar{y}$) is the number where y does not appear; and N is the number of documents.

Also, it is noted that the following equations are important:

$$f(x)=f(x,y)+f(x,\bar{y})$$

$$N=f(x)+f(\bar{x})=f(y)+f(\bar{y}).$$

Weighted terms 334 can be sorted in a descending order based on $\chi^2$ values, which can be calculated based on the following expression:

$$\chi^2 = \frac{\left(f(x,y)-\frac{f(x)\cdot f(y)}{N}\right)^2}{f(x)\cdot f(y)/N} + \frac{\left(f(x,\bar{y})-\frac{f(x)\cdot f(\bar{y})}{N}\right)^2}{f(x)\cdot f(\bar{y})/N} + \frac{\left(f(\bar{x},y)-\frac{f(\bar{x})\cdot f(y)}{N}\right)^2}{f(\bar{x})\cdot f(y)/N} + \frac{\left(f(\bar{x},\bar{y})-\frac{f(\bar{x})\cdot f(\bar{y})}{N}\right)^2}{f(\bar{x})\cdot f(\bar{y})/N}.$$

The top scoring terms can be identified or generated by Chi-square calculation module 510 based on $\chi^2$ values exceeding or meeting a selected threshold. Chi-square calculation module 510 generates terms associated with the query term(s) or associated terms 514 for information retrieval.

At step 610, information retrieval system receives associated terms 514. Information retrieval system 516 can access or receive resources 344 comprising clusters 346 and synonyms 348 also illustrated in FIG. 3. For example, during information retrieval, each synonymous term of a synonym such as "Windows family" can be mined and/or matched in the text corpus or content 518 for information retrieval. Information retrieval system 516 retrieves content associated with query term(s) 508 and/or associated terms 514 and outputs associated terms and content as indicated at 520.

Figure 7A:
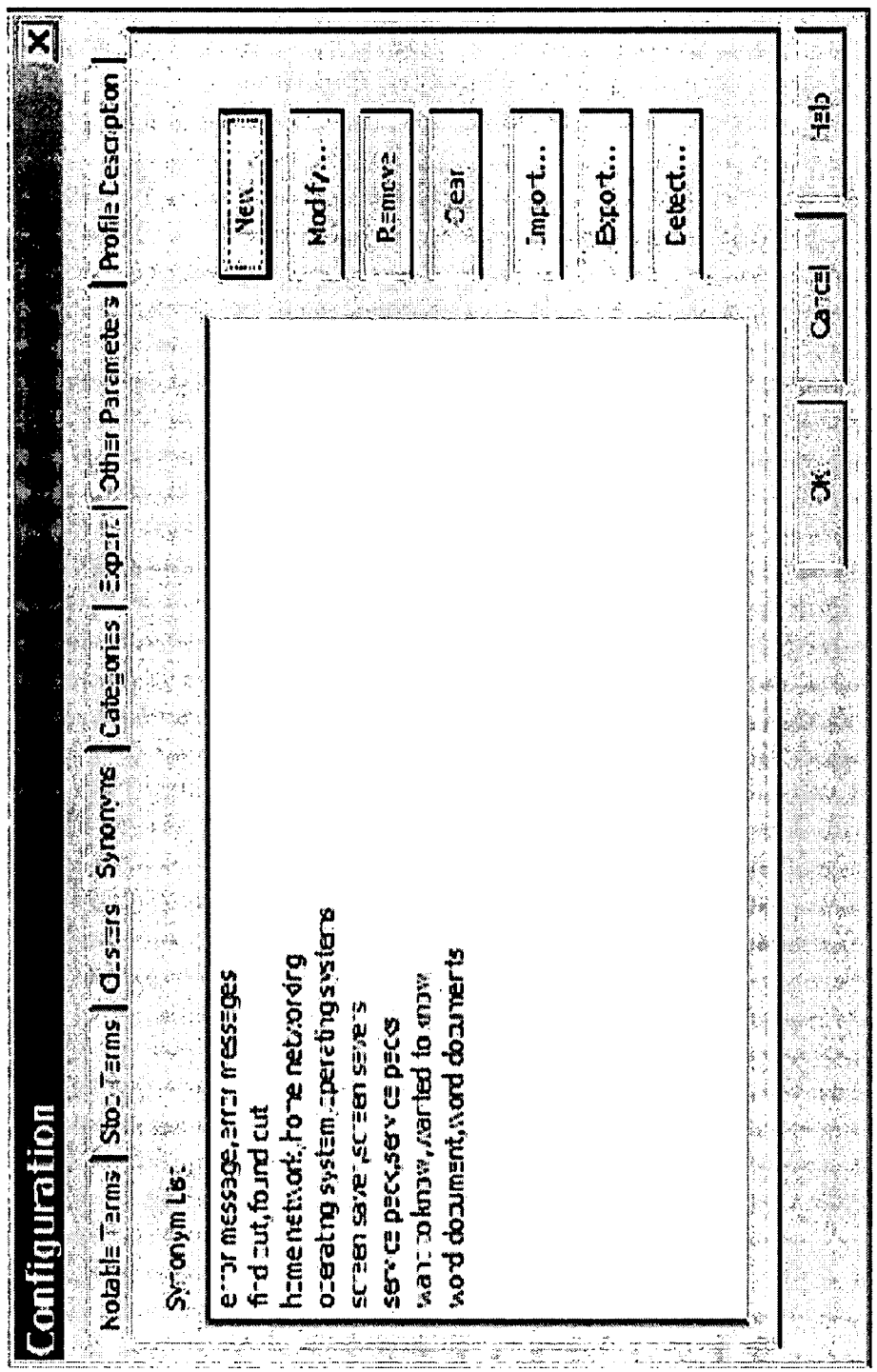
FIGS. 7a-7b illustrate a user interface in accordance with the present inventions.
Figure 7B:
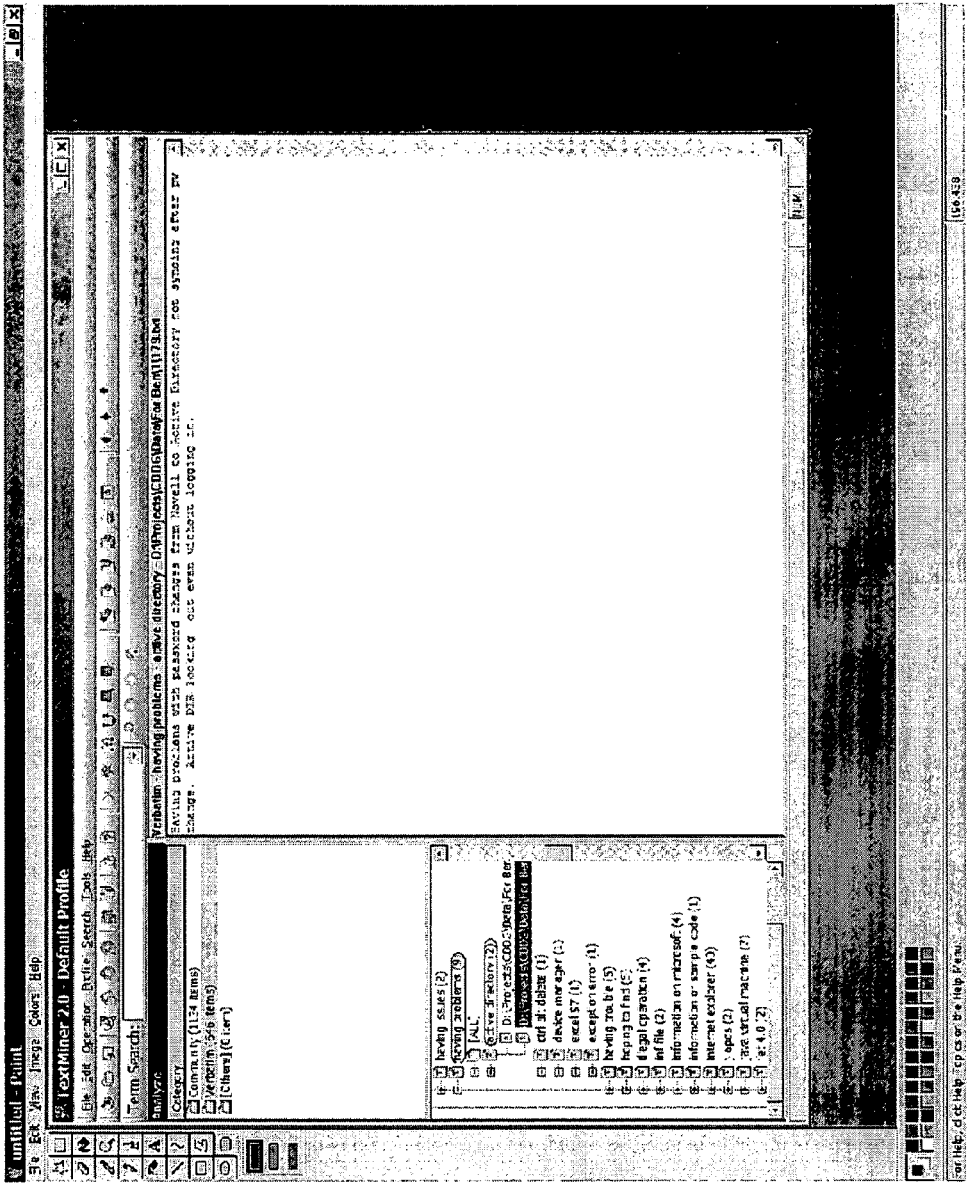

FIGS. 7a-7b illustrate screen shots of a graphical user interface in accordance with the present inventions.

In utilizing the present inventions, the user can access user resources, which can be used for personalized analyses. The user's profile can be viewed as a description of these resources. All user profiles (from one or more users) can be maintained in a central server protected by user authentication functionality. The profiles can be updated and/or shared with other users as desired.

FIG. 7A illustrates a configuration of resource synonyms. FIG. 7B illustrates category view and key term finder of a specific text mining system. The top-left portion of FIG. 7B is the category view. The input texts or documents are classified into pre-defined categories and the number after each category label (e.g. community, verbatim, etc.) is the count of files under the category. The bottom-left portion of FIG. 7B is the key term view. The circled phase "having problems" is a key term and the phrase "active directory" is one of the associated terms of "having problems". The right portion is displaying the selected messages, e.g. email messages. In the display, the term "having problems" and associated term "active directory" are illustrated.

Although the present invention has been described with reference to particular embodiments, workers skilled in the art will recognize that changes may be made in form and detail without departing from the spirit and scope of the invention.

What is claimed is:

1. A method of performing text mining comprising:
identifying consecutive words strings in unstructured text documents;
generating a list of term candidates based on context independency values calculated based on entropy of left context and right context word strings surrounding the consecutive word strings;
generating a list of key terms from among the list of term candidates
receiving a query over a user interface;
calculating Chi-square values wherein Chi-square values are calculated between at least some terms of the query and at least some of the key terms to identify the associated terms from among the key terms using a Chi-square expression based on count information of at least some query terms and at least some key terms in the text documents, wherein the count information includes a number of documents where both query terms and key terms appear, a number of documents where query terms appear but key terms do not appear, a number of documents where query terms appear, a number of documents where at least some query terms do not appear and key terms appear; a number of documents where at least some query terms nor key terms appear; a number where at least some query terms do not appear, a number where key terms appear, and a number where key terms do not appear; and
providing content in the unstructured text documents over the user interface based on the query.

2. The method of claim 1, and further comprising retrieving content from the unstructured text documents, wherein the content is associated with the associated terms.

3. The method of claim 2, and further comprises retrieving content from the unstructured text documents using at least one of clusters and synonyms associated with the unstructured text documents.

4. The method of claim 1, and further comprising maintaining a user profile from each user, wherein the user profile comprises at least one of notable terms, stop terms, synonyms, clusters, and categories.

5. The method of claim 1, wherein generating a list of term candidates comprises identifying consecutive word strings in the unstructured text.

6. The method of claim 5, wherein identifying consecutive word strings comprises using at least one of a suffix array or a longest common prefix (LCP) array.

7. The method of claim 5, wherein generating a list of key terms from among the list of term candidates comprises calculating mutual information values of constituent word strings in term candidates.

8. The method of claim 1, wherein generating a list of key terms from among the list of term candidates comprises providing weight and count information for each of the listed key terms.

9. A computer readable storage medium including instructions which, when implemented, cause a computer to perform a method comprising:
identifying a list of term candidates in unstructured text comprising calculating context independency values based on entropy of left context and right context word strings surrounding consecutive word strings in the unstructured text to generate term candidates;

generating a list of key terms from among the list of term candidates;

receiving a query over a user interface;

calculating Chi-square values between at least some terms of the query and at least some of the key terms to identify associated terms from among the key terms using a Chi-square expression of the form $$\chi^2 = \frac{\left(f(x,y) - \frac{f(x) \cdot f(y)}{N}\right)^2}{f(x) \cdot f(y)/N} + \frac{\left(f(x,\overline{y}) - \frac{f(x) \cdot f(\overline{y})}{N}\right)^2}{f(x) \cdot f(\overline{y})/N} + \frac{\left(f(\overline{x},y) - \frac{f(\overline{x}) \cdot f(y)}{N}\right)^2}{f(\overline{x}) \cdot f(y)/N} + \frac{\left(f(\overline{x},\overline{y}) - \frac{f(\overline{x}) \cdot f(\overline{y})}{N}\right)^2}{f(\overline{x}) \cdot f(\overline{y})/N}.$$

where x represents at least some of the query terms, y represents at least some of the key terms, N represents the number of documents, f(x,y) is the number of documents where both terms x and y appear, f(x,$\overline{y}$) is the number of documents where x appears but y does not appear, f(x) is the number of documents where x appears, f($\overline{x}$,y) is the number of documents where x does not appear and y appears, f($\overline{x}$,$\overline{y}$) is the number of documents where neither x nor y appears, f($\overline{x}$) is the number where x does not appear, f(y) is the number where y appears, f($\overline{y}$) is the number where y does not appear; and retrieving information in the unstructured text documents associated with at least one of the listed key terms.

10. The computer readable storage medium of claim 9, wherein identifying term candidates comprises:

identifying the consecutive word strings in the unstructured text using at least one of a suffix array and a longest common prefix (LCP) array.

11. The computer readable storage medium of claim 9, wherein identifying a list of term candidates comprises accessing at least one of synonyms and clusters to retrieve information from the unstructured documents associated with the synonyms or clusters.

12. The computer readable storage medium of claim 9, wherein generating a list of key terms from among the term candidates comprises identifying consecutive word strings in the unstructured text using at least one of a suffix array and an LCP array.

13. The computer readable storage medium of claim 12, wherein generating a list of key terms from among the list of term candidates comprises calculating mutual information values of constituent word strings in term candidates.

14. A computer readable storage medium including instructions which, when implemented, cause a computer to perform text mining, the instructions comprising:

a key term extraction module adapted to identify a list of key terms in documents of unstructured text; and a text mining module adapted to receive a query and associate at least a portion of the query with some of the key terms based on Chi-square values to generate associated terms, wherein Chi-square values are calculated between at least some terms of the query and at least some of the key terms to identify the associated terms from among the key terms using a Chi-square expression based on count information of at least some query terms and at least some key terms in the text documents, wherein the count information includes a number of documents where both query terms and key terms appear, a number of documents where query terms appear but key terms do not appear, a number of documents where query terms appear, a number of documents where at least some query terms do not appear and key terms appear; a number of documents where at least some query terms nor key terms appear; a number where at least some query terms do not appear, a number where key terms appear, and a number where key terms do not appear, wherein the key term extraction module identifies consecutive word strings in the unstructured text using a suffix array and generates a list of term candidates based on context independency values, wherein the key term extraction module calculates context independency values based on entropy of left context and right context word strings surrounding the consecutive word strings to generate term candidates, and wherein the text mining module retrieves information from the unstructured text documents based on the query.

15. The computer readable storage medium of claim 14, wherein the term extraction module calculates mutual information values of constituent word strings in term candidates to generate a list of key terms, and wherein the term extraction module re-counts at least some of the weighted term in the unstructured text.

16. The computer readable storage medium of claim 14, and further comprising a synonym construction module adapted to generate all morphological forms of key terms or their constituent word strings.

17. The computer readable storage medium of claim 14, wherein the text mining module retrieves information from the unstructured text that is associated with the associated terms.

* * * * *